May 14, 1940. R. S. DRUMMOND 2,200,544
METHOD OF FINISHING SURFACES
Filed Feb. 8, 1937 3 Sheets-Sheet 1
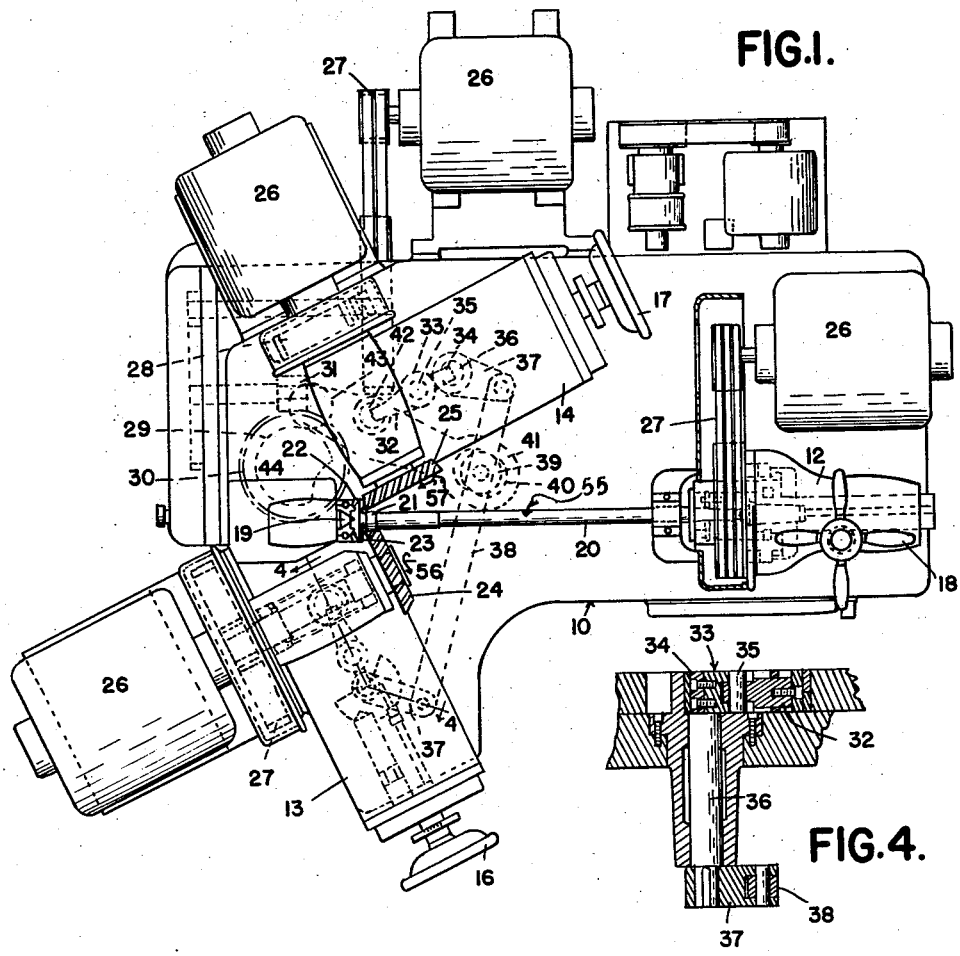
INVENTOR
ROBERT S. DRUMMOND
BY Whittemore Hulbert + Belknap
ATTORNEYS

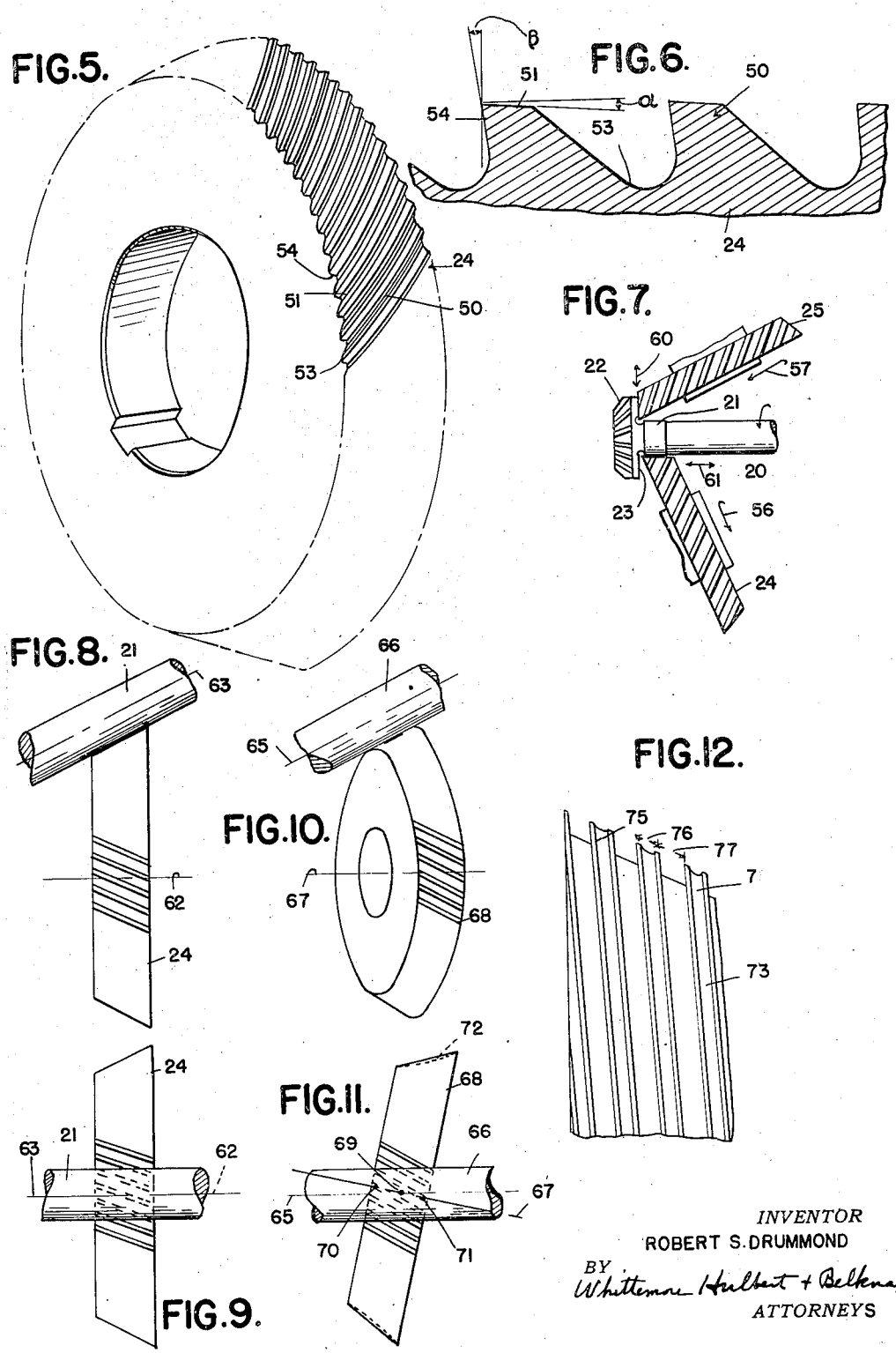

May 14, 1940. R. S. DRUMMOND 2,200,544
METHOD OF FINISHING SURFACES
Filed Feb. 8, 1937 3 Sheets-Sheet 3

INVENTOR
ROBERT. S. DRUMMOND
BY Whittemore Hulbert + Belknap
ATTORNEYS

Patented May 14, 1940

2,200,544

UNITED STATES PATENT OFFICE 2,200,544

METHOD OF FINISHING SURFACES

Robert S. Drummond, Detroit, Mich., assignor to National Broach & Machine Company, Detroit, Mich., a corporation of Michigan Application February 8, 1937, Serial No. 124,790

2 Claims. (Cl. 90—11)

The invention relates to methods and apparatus for finishing round or flat surfaces, and more particularly it relates to a new art of removing metal from such surfaces which, in its accuracy of finishing, resembles more nearly the art of grinding, but which nevertheless is distinctly a cutting or shaving operation resulting in the removal of fine chips or shavings from the surfaces.

The invention in its broader aspects has many and varied uses, and this application is directed to the invention in its broadest sense. On the other hand, the application is also directed to certain specific embodiments of the invention and therefore in the description hereinafter given, reference will be made particularly to a method and apparatus for finishing flat and cylindrical surfaces such as will be found, for example, on axle shafts for motor vehicles.

One of the objects of the invention is to provide a method for finishing surfaces which, while being extremely accurate, is also rapid, thus having great adaptability in the mass production of automotive parts.

Another object of the invention is to provide a new type of rotary cutting tool adapted for many uses in connection with the accurate finishing of round or flat surfaces.

Still another object of the invention is to provide a rotary cutting tool capable of removing extremely fine shavings from metal surfaces and which is operable at pressures greatly less than that for cutters now employed for finishing surfaces.

A further object is to provide a machine adapted for rapid and accurate finishing of round and flat surfaces.

A more specific object of the invention is to develop a machine and suitable cutting tools therefor which are adapted for the simultaneous finishing of adjacent round and flat surfaces.

These and other objects are accomplished by the methods and apparatus hereinafter more fully described and illustrated in the accompanying drawings, wherein:

Figure 1 is a plan view of a machine embodying my invention;

Figure 2 is a partial end view of the machine;

Figure 3 is a partial end view of a carriage and guideways therefor;

Figure 4 is a section taken on line 4—4 of Fig. 1;

Figure 5 is an enlarged fragmentary perspective of one of the cutters;

Figure 6 is a fragmentary section of several adjacent cutting teeth;

Figure 7 is a diagram illustrating a modified method of shaving round and flat surfaces;

Figure 8 is a diagram showing one method of arranging the cutter with respect to a cylindrical surface;

Figure 9 is a diagram at right angles thereto;

Figure 10 is a view view similar to Figure 8 showing a modified arrangement;

Figure 11 is a view at right angles to Figure 10;

Figure 12 shows a modified cutter;

Figure 13:
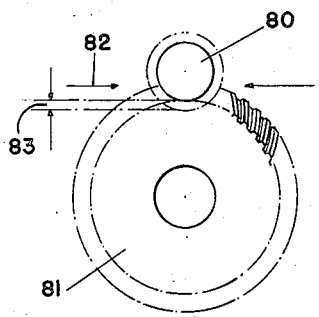
Figure 13 is a diagram showing a method of feeding a cutter to finish round surfaces.

In the drawings, the base of the machine is indicated at 10. Adjustably mounted on the base on suitable guideways shown at 11 in Figs. 2 and 3, are a tail stock 12 and tool carriages 13 and 14. Each carriage is adjustable on a guide 15, the initial adjustment being made by means of setting wheels 16, 17. The tail stock is set by manipulation of handle 18, the work being held by the tail stock and a center 19 on the base. As shown in Fig. 1, the particular type of work to be finished is an axle 20 having a cylindrical bearing surface 21 and a bevel gear 22 formed integral with the axis, the back face 23 of the gear and the surface 21 being those surfaces which are to be finished.

Each of the carriages 13, 14, and its guideway is angularly disposed to the axis of the axle to be finished. On each carriage there is journaled a cutting tool indicated at 24, 25. The axis of each cutter is disposed at a right angle to its particular guideway, and the cutter has a cutting face angularly disposed to the axis of the tool. In Fig. 1 it will be seen that the tool resembles a bevel gear having spiral teeth thereon. The angle of the cutting face is such that when the tool is moved into cutting relation with the work, it will be parallel to the surface to be finished.

In the drawings are shown four motors, all indicated by the numeral 26, one for each of the tools, another for rotating the work, and still another for operating means to reciprocate the tools toward and from the work. Connecting the motors and their respective driven members are belts or chains 27 and suitable speed reduction mechanisms 28. Initially, the tools are set on guides 15 to make a definite plunge cut in the surfaces to be finished. The means for subsequently moving the tools towards and from the work include a cam 29 fixed with relation to worm wheel 30, the latter being rotated by worm 31 forming part of the reduction mechanism between the cam and its driving motor. Each of the guides 15 is connected to one link 32 of a toggle mechanism 33, the other link 34 of which is pivoted to link 32 at 35. The pivot 35 is movable in an arcuate path about shaft 36, having means thereon for rocking the toggle. The axis of shaft 36 is fixed with relation to the base of the machine. It will thus be seen that the connection between link 32 and guide 15 is movable towards or from shaft 36 as the toggle is straightened or bent.

The means for rocking shafts 36 include an arm 37 keyed to each shaft and a connecting link 38, the ends of which are pivotally connected to arms 37. Mounted on link 38 is a roller 39 adapted to cooperate with an elongated opening 40 in one end of lever 41, the latter being pivoted intermediate its ends to the base at 42. At the other end of the lever is a cam follower 43 cooperating with cam 29. It will be seen that cam 29 is provided on its peripheral face with a dwell 44 permitting follower 43 to move radially toward the center of the cam whereupon roller 39, link 38 and arms 37 are moved. This results in a bending of the toggles, which in turn simultaneously move the carriages and the tools carried thereby away from the work. This movement may be effected by suitable spring mechanism or a track cam if desired. As will be apparent, the toggles will impart a controlled feeding action to the tools irrespective of the specific cam action. Since the toggles are straight when the tools are at maximum depth, it will be evident that the feed of the tools into the work takes place at a decreasing rate of speed as the tools approach depth. This is an inherent result of the use of toggles for a feeding mechanism and the result is highly desirable, since the last few cuts taken by the finishing tool will be very light and of decreasing amount. This tends to produce what may be termed a finishing action following a heavier rough cut. This action contributes greatly to the accuracy and finish of the cut taken.

It will also be noted that the accuracy and fineness of the cut is further increased by the angle at which the tool is fed into the work. Thus an incremental feed of a predetermined amount along the path of feed results in a cut which is only a fraction of the amount of feed. Also, suitable automatic limit switches for stopping the motor while the machine is being loaded and unloaded are provided.

The arrangement of the carriages and crossed axes just described obviously permits the advance of tools of relatively small diameter towards and into cutting relation with the work, although their driving mechanisms may be somewhat larger than the tool itself. Also, the pressure angle of the cutting face permits shaving of the surface with less compression of the metal. Because the driving means for the tool and work are independent of each other, it is possible to regulate the cutting actions of the tools and thus insure the most efficient operating conditions for finishing two surfaces, like or unlike, simultaneously.

In Figure 1, it will be noted that the cutting tool 24 is used for finishing the round surface 21, and the cutting tool 25 is used for finishing the flat surface 23. Figure 5 shows an enlarged perspective view of the cutter 24. While my invention in its broader aspects contemplates cutters of various types, I will first specifically describe one form of cutter which has proven very satisfactory for commercial production in the finishing of axle shafts. The cutter 24 has spiral teeth 50 formed in the beveled face of the tool and, as shown, the teeth are disposed in the form of a left-hand spiral. In the particular cutter illustrated, the distance between adjacent teeth in normal section is .160 of an inch. The tops 51 of the teeth have a width of $\frac{3}{64}$ of an inch and are backed off or relieved at a suitable angle $\alpha$, such as 2°. Intermediate adjacent teeth are recesses 53 of a suitable width and depth to carry away the shavings, and, as shown, this depth is $\frac{3}{32}$ of an inch. The recesses are so shaped as to provide a suitable rake on the front face 54, such as a rake angle $\beta$ of 5°. The cutter as shown has an outside diameter of $6\frac{11}{16}$ inches and a face width of 1 inch. The tool 24 is designed to operate in the shaving of the round surface 21, the diameter of which is 1¼ inches.

The use of beveled cutters in the relationship disclosed and according to the teachings of the present method offer several important advantages. In the first place, it will be recognized that beveled cutters provide spaces between adjacent cutting edges of increasing width from the narrow end of the cutter to the wide end thereof. If this cutter is properly associated with the working surface so that the cutting action is initiated at the narrow end of the cutter, the chip will be formed in a direction toward the wide end of the cutter. As a result of this, the increasing width of the space between adjacent cutting edges provides for more efficient chip disposal.

The cutter 24 in Fig. 1 is illustrated as in this relationship. Since this cutter is shown with the cutting edges arranged in a left hand spiral and since the cutter is rotated clockwise as viewed from the motor end, each cutting edge will initiate its cutting action at the narrow end of the cutter.

Another consideration to be borne in mind when dealing with beveled cutters is the difference in surface speeds between the large and small end of the cutter. This may be taken advantage of in order to maintain a more uniform relative speed between cutter and working surface when working on a surface which is angularly disposed to the axis of the work piece. Thus in Fig. 1 the cutter 25 is engaging a radially disposed working surface. The large end of the cutter 25 has a greater surface speed than the small end of the cutter. In this particular type of cutting, the work piece is also rotated at substantial speeds and due to the relative distance from the axis, the outside of the radially disposed working surface 23 has a surface speed substantially higher than the inner portion thereof. As will be evident, these relative speeds are such that they tend to produce a more uniform relative speed between cutter and work surface.

The other cutter 25 is constructed to shave the flat surface 23, which is an annular surface extending radially outward from the round surface 21. The face extends to the outer diameter of the gear 22 which is 2⅞ inches in diameter. The cutting tool 25 is constructed in the same manner as the cutting tool 24, but the teeth are in the form of a right-hand spiral instead of a left-hand spiral.

The method of surface finishing disclosed herein has an important application in the simultaneous finishing of angularly related working surfaces. Thus in the illustration of Fig. 1 the surfaces 21 and 23 are contiguous and angularly related so that they form a space defined by the angularly related surfaces from which chips must be removed. By providing the cutter 25 as a right-hand cutter and rotating it in the direction shown in Fig. 1 it will be evident that the chips formed by this cutter will be formed in a direction generally radially outward which will tend to clear the space just mentioned.

In applying beveled cutters to various surfaces, the various considerations just mentioned should be borne in mind, since in some circumstances it is necessary to select cutter angle so that one advantage will be obtained at the sacrifice of another.

In addition, the surface speeds of the cutter are much more uniform than is the case where a radial surface is cut by an end cutting milling cutter, where the radial distance between the inner and outer limits of cut on the work equals the difference in the radii of rotation of the corresponding parts of the cutter. It is important that the relative rotations of the cutting tools and the axle be properly determined, and one relationship which has proven satisfactory in this specific case is to rotate the axle 20 at 425 R. P. M., the cutter 24 at 125 R. P. M., and the cutter 25 at 250 R. P. M. The direction of rotation is also important, since it is desired that the movement of the work surface past the cutting tool should be against the spiral angle of the tool. The directions of rotation are indicated in Figure 1, the arrow 55 indicating the direction of rotation of the axle 20, and the arrows 56 and 57 illustrating respectively the rotation of the cutters 24 and 25.

With the cutting tools and speeds as above described, it has been found that both the round and flat surfaces to be finished can be finished very accurately by the plunge cutting previously described. The direction of feed of the cutters 24 and 25 during the plunge cut is inward along the axes of carriages 13 and 14 respectively at a small angle to the surface of the work. For the finishing of these surfaces to a desired stand, it ordinarily requires the removal of .012 of an inch on each side of the round diameter 21, and the removal of .020 of an inch from the flat surface 23.

The herein disclosed method of finishing contiguous angularly related surfaces offers important advantages where these surfaces form either an angle which is acute or an angle which is close to a right angle. Thus it will be seen from an inspection of Fig. 1 that if an attempt were made to cut the surface 21 with a cylindrical edge cutting tool, that the side of this tool would or might interfere with the radial surface 23. At the same time it will be evident that if an attempt were made to cut the radial surface 23 with a cylindrical cutter, the side of this cutter would interfere with the round surface 21. This interference could of course be avoided by carefully spacing the tool from the surface which it is desired to clear, but this would necessarily result in failure to cut the surface being worked on to the intersection of the surfaces. By providing beveled tools and by feeding these tools at the angles shown in Fig. 1, it is possible to completely finish the surfaces up to the intersection of the surfaces. Thus not only does the use of bevel tools introduce new and desirable finishing results, but also such use permits the accurate finishing of angularly related contiguous surfaces of revolution to an extent which has not hitherto been possible.

It is to be understood that the specific data with respect to the cutting tools, rotations, feeds, etc., has been given above merely by way of example and is capable of considerable modification. However, to obtain good shaving action, it is necessary that the various factors, described above, be definitely correlated, and the example has been cited to show one suitable way for obtaining these results.

In the machine as illustrated in Figure 1, the shaving action is effected by plunge cutting only, but the invention is also capable of embodiment in other modified methods. For example, it may be desirable to introduce a slight oscillation or single cross feed at the end of the plunge cutting cycle in a direction parallel to the surface to be finished. Such an additional movement has the tendency to improve the surface finish by "cleaning up" the slight imperfections or tool marks which may be left by the plunge cut operation. This is diagrammatically illustrated in Figure 7. The cutter 25 is given an oscillation indicated by the arrow 60 parallel to the surface 23, and the cutter 24 is given an oscillation indicated by the arrow 61 parallel to the axis of the shaft 20. This oscillation is preferably imparted only at the conclusion of the plunge cutting stroke and is ordinarily of relatively small amplitude, since this is sufficient for cleaning up the surface. For example, a feed of only ⅛ of an inch is ordinarily sufficient. However, if desired, the oscillation may be simultaneous with the infeed due to the plunge cutting.

In the finishing of cylindrical surfaces as shown in Figure 1, the axes of the cutter 24 and the axle 20 lie in the same plane. The relationship of the parts is shown in the diagrams, Figures 8 and 9, where 62 is the axis of the cutter 24 and 63 is the axis of the round work piece 21. In Figure 9 both axes appear to be coincident.

The invention also contemplates the finishing of round surfaces where the axes of the work and cutter do not lie in the same plane but are crossed at a limited angle. This is diagrammatically illustrated in Figures 10 and 11 where 65 represents the axis of the cylindrical work piece 66, and 67 is the axis of the cutter 68. When the axes are crossed as illustrated, the zone of contact instead of extending across the face width of the cutter as in Figure 8, would extend only for a limited distance on each side of the center 69 of crossed axes. In other words, at the points 70 and 71 there would normally be a certain amount of clearance or backlash due to the crossed axes relationship. In order to compensate for this backlash, the double cutter 68 has its surface hollowed or dished as indicated by the line 72, and by properly proportioning the amount hollowed out, the cutter can be provided with a surface which will cut uniformly over the entire face width of the cutter.

It should be understood that if it is desired to shave a cylindrical surface 66 for a greater axial distance than the width of the cutter 69, a feed movement can be given parallel to the axis of the work. It should also be understood that where a cutter is not dished but has a straight bevel surface, the finishing action along the surface of the cylindrical work 66 may be obtained by a feed movement in the direction of the axis of the work, or other direction as explained in Figure 20.

A modified form of rotary cutting tool is shown in Figure 12. This cutter 73 is generally similar to the cutter 24 shown in Figure 5, except that the teeth 75 are inclined at a greater helical angle and now resemble worm threads. In the construction illustrated, there are eight threads, each having a lead equal to the width of the cutter, which is in this case approximately 1 inch. As shown, the width of the lands 76 is approximately equal to the width of the gashes 77, and the depth of each gash is equal to its width. These dimensions of course may be varied under different working conditions. It has been found that excellent results may be obtained working with tools having the widths of their teeth and recesses and the approximate depth of the recesses all .060 of an inch. In some instances it may be desirable to provide shallow concave grooves 78 in the faces of the lands, thereby to reduce the contact surface of the tool on the work. Regardless of whether the lands are straight or grooved, it is apparent that a plurality of closely spaced cutting edges operate simultaneously on the work. Since these lands are disposed angularly to the line of contact between the work and the tool, the point at which the cutting edge engages the work constantly shifts upon rotation of the tool or the work, or a combined rotation of the work and the tool. The rotation of the tools and the work is so timed that the cutting speed can be regulated to obtain the best cutting results.

Obviously the faces of the lands act as limiting gauges and, depending on the pressure on which the tool is forced against the work, the depth of the cut can be controlled to shave the work to a minimum hitherto impossible with the known types of cutting tools. Since the ordinary pressures necessary to cut with the present method are much reduced, the heating of the work due to the cutting action is reduced to a minimum. It has been found in practice that the shavings and chips are not discolored as is the case when cuts of several thousandths of an inch are taken, most tools having to dig into the metal to such an extent that the metal removed shows unmistakable signs of having reached relatively high temperatures during the cutting operation. This objectionable heat effect is entirely absent in the present invention.

While the invention has been described as one applicable to the finishing of surfaces on rotating work pieces, it is not intended that it be limited to the specific embodiment illustrated. And while the operation has been described as a plunge cut, i. e., with no reciprocation of the tool or work during the cutting operation, it is obvious that means for moving either the work or the tools, or both, to effect relative axial movement thereof, may be employed. Under some circumstances it may be found desirable to gear the work and tools, in which case a single drive motor is contemplated, but for flexibility and variety of operations, it has been found expedient to employ independent drives.

Referring again to Figure 1 which shows rotary cutters operating on both round and flat surfaces, it is desired to point out that by reason of the arrangement of the cutting edges on the tools, together with the fact that both the tools and the work are simultaneously rotated, an entirely novel type of cutting action takes place. The chips made by these tools are slivers, and unlike chips from milling cutters or other machine tools which are normally used for finishing surfaces. The chips from the cutting tools of my invention have more the appearance of lathe chips and are not upset as much as the chips from milling cutters. This may be explained from the fact that the teeth on the cutter cut more nearly around the work piece in a generally circular direction and do not cut straight across the piece, even though the cutting edges of the teeth contact at points lying in a straight line. Generally speaking, the cutting edges cut the work piece along lines which are transverse to the axis of the work and extend at an angle between 10° and 80°. Thus the cutting edges take long chips from the surface by cutting in a thread-like path, but finish a uniform surface shape whether this be a flat surface or a round surface.

In Figure 13 I have shown a modified method of finishing a round surface to the specified dimensions. In this figure, 80 represents the cylindrical work piece and 81 the cutter. Instead of plunge feeding as shown in Figure 1, I provide a cross feed of the cutter relative to the work in the direction of the arrow 82. Thus the cutter is first offset laterally with respect to the work and is fed toward the work for a distance 83 sufficient to give the specified depth of cut, and the cutter is then fed in the direction of the arrow 82. This finishes the cylindrical surface completely to a predetermined size. If it is desired to reduce the size still further, the cutter may be again fed toward the work and again caused to traverse in the direction of the arrow 82, or in the opposite direction.

Figures 14, 15:
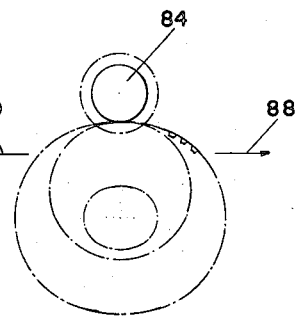
Figures 14 and 15 are diagrams at right angles to one another illustrating another method of feeding for finishing round surfaces.

Figures 14 and 15 further illustrate methods of finishing round surfaces in accordance with my invention. In this case, the cylindrical work piece 84 is acted upon by the beveled rotary cutter 85, and the arrows 86 and 87 indicate alternative methods of infeeding toward the work. Arrow 86 shows the infeed in a plane transverse to the axis of the cylindrical work piece 84, while arrow 87 shows the feed in a plane transverse to the axis of the rotary cutter 85. Either of these infeeding motions may be combined with a cross-feed as indicated by the arrow 88. Again the cross-feed may be in the reverse direction as indicated by the arrow 89.

Figure 16:
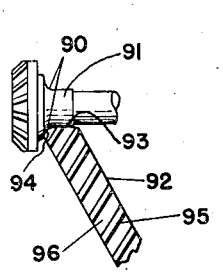
Figure 16 is a diagram illustrating a modified cutter for finishing a corner radius in addition to a round surface.

In Figure 16 I have indicated a method for finishing cylindrical surfaces having a corner radius, or fillet, 90 adjacent the cylindrical surface 91. In this case, the beveled cutter 92 has the beveled surface 93 rounded as at 94 to correspond in shape to the corner radius 90. The teeth 95 in this cutter are formed, as in the previously described cutters, by a series of grooves 96 extending helically. These grooves must be of sufficient depth at the rounded corner 94 so that the tops of the lands intermediate the grooves when rounded will still leave sufficient depth of groove to form the cutting edges.

Figure 17:
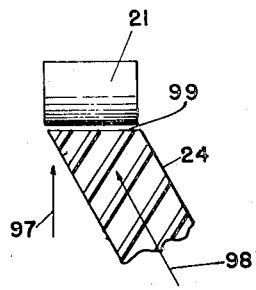
Figure 17 is a diagram illustrating modified methods of feeding to finish a surface to the required size.

Figure 17 illustrates a further method of finishing cylindrical surfaces slightly modified from that illustrated in Figure 1. The cylindrical surface 21 is acted upon by the beveled face of the cutter 24. The surface may be completely finished by means of a plunge cut toward the work in the direction indicated by the arrow 97 which is in a plane perpendicular to the axis cylindrical to the work. However, the direction of feed of the plunge cut may be along some inclined line as indicated by the arrow 98, in which case it is only necessary that the beveled surface 99 of the cutter be of sufficient width to contact with the entire active surface of the work 21, both at the beginning and the end of the plunge cut.

Figure 18:
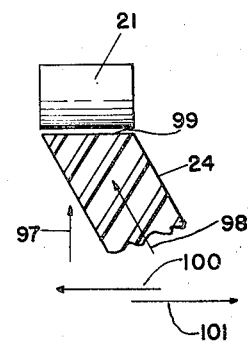
Figure 18 is a similar diagram showing other methods.

A further modification of this method is indicated in Figure 18 where, instead of having merely a plunge cut as indicated by the arrows 97 and 98, there may also be combined a single cross-feed in the direction of the arrow 100. Similarly, the plunge feeds 97, or 98, may be combined with the cross-feed 101 in the direction opposite to the arrow 100.

Figure 19:
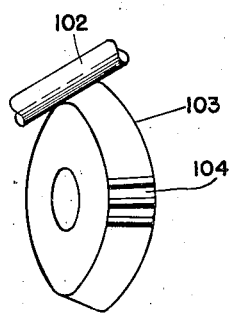
Figure 19 is a diagram similar to Figure 10 showing a modified form of cutter.

In describing the various forms of cutters which may be used, I have referred usually to the fact that the grooves forming the cutting edges extend in a helical path. However in some instances, it may be desirable to have these grooves radial as indicated in Figure 19. In this figure the cylindrical work piece 102 is acted upon by the cutter 103 in which the grooves 104 extend radially.

Figure 20:
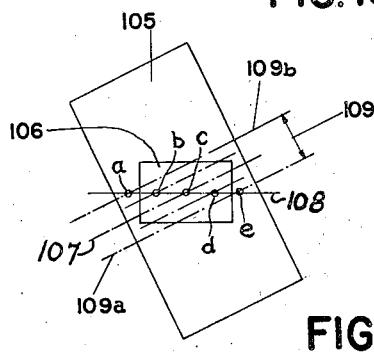
Figure 20 is a diagram showing the method of obtaining a uniform cylindrical surface when the axes of the tool and the cutter are crossed.

To further illustrate the method of finishing a cylindrical surface, reference should be made to Figure 20. In this case, a relatively wide cutter 105 is used for finishing the cylindrical bearing surface 106. The axis 107 of the cutter is crossed with respect to the axis 108 of the work piece. Instead of moving the cutter in the direction of its axis to spread the finishing action over the surface of the work, it may be moved in some other direction as indicated by the arrow 109. Thus it will appear that the axis 109 of the cutter will move from the position 109a to the position 109b. The points where the two axes cross, thus progressively spread across the face of the cylindrical work piece as will be evident by the letters a, b, c, d and e. This action can either be the translation of a straight-faced cutter as illustrated in Figure 20, or a dish-type cutter as illustrated in Figures 10 and 11. In either case, the shaving action is transferred along the surface to be finished so as to spread the cutting action uniformly.

What I claim as my invention is:

1. The method of finishing a work piece having two contiguous, angularly related surfaces of revolution which comprises engaging each of said surfaces with an edge cutting tool, said tools engaging said surfaces in line contact and having cutting edges crossing said line contact, rotating said work piece and both of said tools at substantial speeds, at least one of said tools having its cutting edges of such angularity that each edge initiates its cut adjacent the angle between said surfaces, and progresses in a direction away from said angle.

2. The method of finishing a surface of revolution of a work piece, the surface to be finished being contiguous to a second surface, said surfaces forming a reentrant angle which comprises positioning a frusto-conical cutter in line contact with the surface to be finished with the large end of said cutter adjacent but spaced slightly from said angle, rotating said work and cutter, and relatively feeding said work and cutter in a direction to cause said cutter to cut to depth, and to cause the large end of said cutter to approach said angle.

ROBERT S. DRUMMOND.